United States Patent [19]

Pease

[11] Patent Number: 5,647,003

[45] Date of Patent: Jul. 8, 1997

[54] METHOD AND APPARATUS FOR ALTERING A MAGNETIC CHARACTERISTIC OF A MEDIUM

[75] Inventor: Kevin J. Pease, Mt. Juliet, Tenn.

[73] Assignee: DocuSystems, Inc., Skokie, Ill.

[21] Appl. No.: 492,782

[22] Filed: Jun. 21, 1995

[51] Int. Cl.⁶ .................................................. H04L 9/00
[52] U.S. Cl. .......................................................... 380/59
[58] Field of Search ........................ 380/3, 59; 235/449, 235/450; 360/2, 134

[56] References Cited

U.S. PATENT DOCUMENTS 5,177,344  1/1993  Pease .......................................... 380/3

*Primary Examiner*—Salvatore Cangialosi
*Attorney, Agent, or Firm*—Laff, Whitesel, Conte & Saret, Ltd.

[57] ABSTRACT

A method for altering a magnetic characteristic of a medium that includes the steps of providing a magnetic write head adjacent to a carrier bearing a fluid magnetic slurry, providing a sequence of randomly arranged information signals, and transmitting the sequence of randomly arranged information signals to a magnetic write head controller. The magnetic write head is operated in response to the controller to provide sequential representations of the randomly arranged information signals at predetermined amplitude levels in the fluid magnetic slurry by altering a magnetically discernible characteristic of the slurry. The fluid magnetic slurry is then cured to permanently fix the sequential representations.

An apparatus in accordance with the invention comprises means for supporting and driving a web bearing a fluid magnetic slurry, magnetic write head means for controllably generating a magnetic field adjacent to the web, means for providing a sequence of randomly arranged information signals, means for transmitting the sequence of randomly arranged information signals to a magnetic write head controller, and means for operating the magnetic write head in response to the controller to provide sequential representations of the randomly arranged information signals at predetermined amplitudes in the fluid magnetic slurry by altering a magnetically discernible characteristic of the slurry.

47 Claims, 3 Drawing Sheets

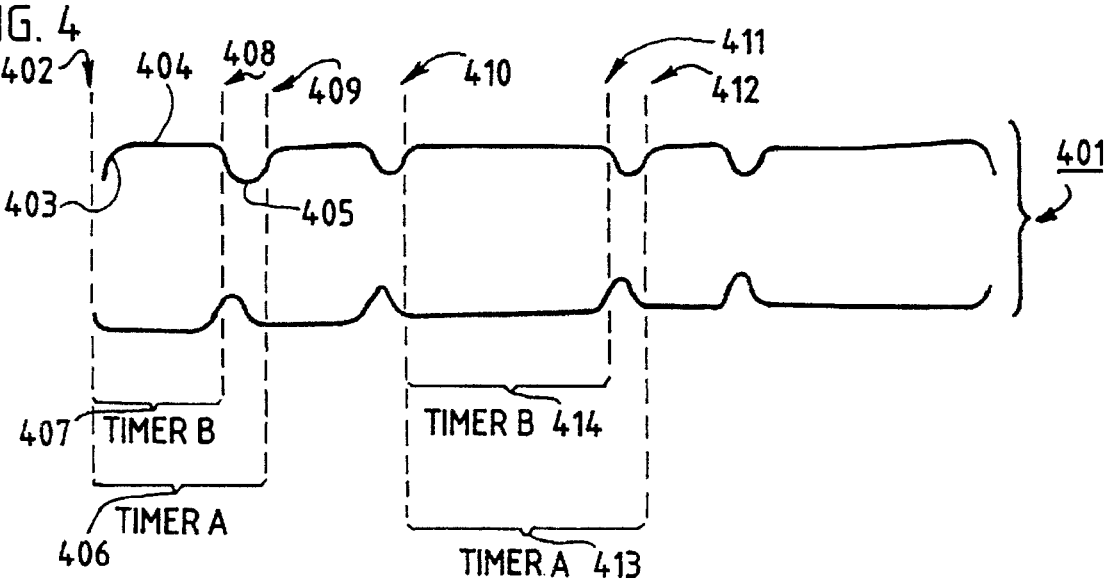
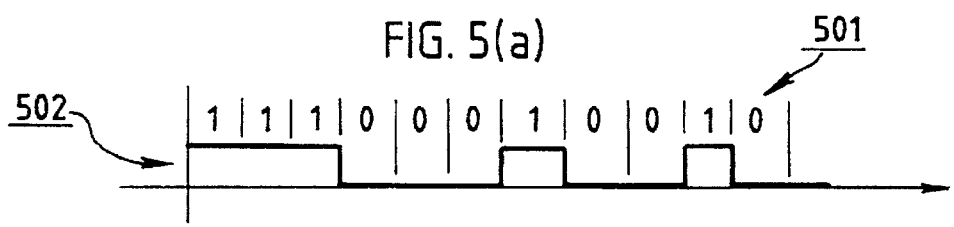
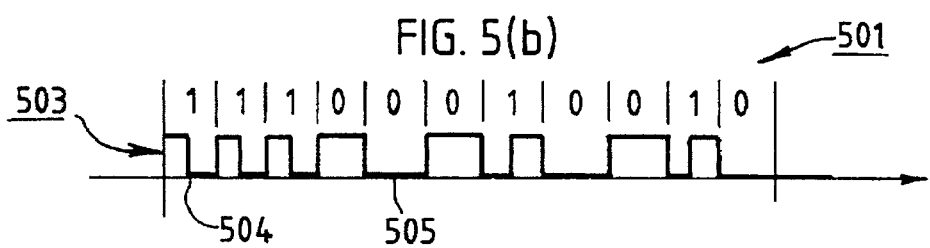
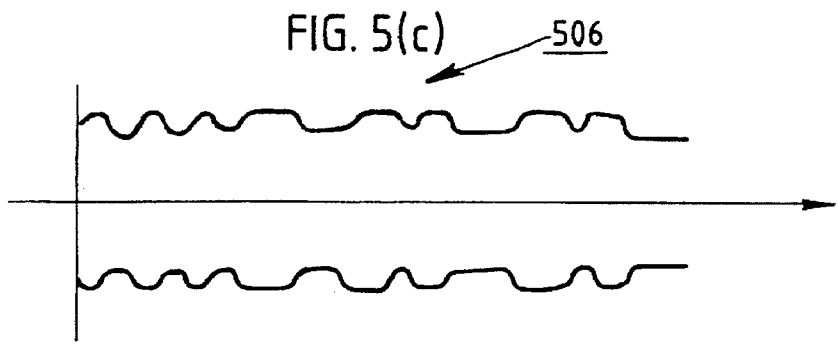

5,647,003

METHOD AND APPARATUS FOR ALTERING A MAGNETIC CHARACTERISTIC OF A MEDIUM

FIELD OF THE INVENTION

This invention relates generally to authentication of documents and in particular to authentication through the use of magnetic media, and is more particularly directed toward alteration of a magnetic characteristic of a medium to create a security characteristic that cannot readily be modified or duplicated.

BACKGROUND OF THE INVENTION

There are numerous varieties of documents that imply, by mere possession, that the holder is empowered to perform certain actions, or is the recipient of certain rights. Bearer bonds, for example, are presumed to be the property of the holder, who may sell or transfer the bonds to another. A driver's license carries with it the presumption that the holder is entitled to operate a motor vehicle.

Of course, some method of authentication is normally associated with each of these documents. Driver's licenses are normally printed on unique forms with a photo of the licensee incorporated into the form, while bearer bonds are printed on special paper with an embossed seal and a certificate number. But a counterfeiter who can obtain the proper form stock can still create duplicate certificates that are difficult to distinguish from legitimate documents.

It has long been known that certain materials possess inherent random characteristics that are useful for document authentication. Paper, for example, has a randomly varying opacity characteristic that can be detected by a transmissivity device. In such a device, a narrow, high-intensity light is directed through the paper and detected by a sensitive photodetector positioned on the opposite side of the paper from the light source. If this varying opacity characteristic is read along a specific portion or portions of the paper, and the resulting opacity values are recorded somewhere on the document (and/or in a separate data base), the opacity test process can be repeated and compared to the stored values to authenticate the document.

It is also known that magnetic materials exhibit an inherent random characteristic that is suitable for authentication purposes. In general, when a magnetic medium is deposited on a carrier material, such as paper or plastic stock, and the medium is read via a sensitive magnetic read head, a noise-like characteristic can be discerned. This characteristic has been demonstrated to be repeatable, and can be useful for authentication under proper conditions.

A method for enhancing this randomly varying characteristic of a magnetic medium is set forth in U.S. Pat. No. 5,177,344, the disclosure of which is fully incorporated by this reference. In this '344 patent, a process is described in which random signals are generated and used to control the character and duration of zones of altered magnetic remanence in a slurry of magnetic material. The slurry is then hardened so that the alterations introduced by the process cannot be changed or easily duplicated by a would-be counterfeiter.

Although these types of random variations have proven to be useful in authentication, there are applications in which mathematically deterministic random variations in magnetic characteristics are useful. For example, with a deterministic random variation, a reading device need look for only a certain kind of randomly appearing characteristic upon which to base its judgment of authenticity. Thus, there is a need for the capability to combine random and deterministic effects to yield more flexible security characteristics.

Accordingly, a need arises for a method and apparatus that permanently alters a magnetic characteristic of a medium in response to predetermined parameters. The process should be flexible enough to permit deterministic random variations of magnetic characteristics to create a magnetic characteristic of a medium that cannot be changed or easily duplicated after its creation.

SUMMARY OF THE INVENTION

These needs and others are satisfied by the present invention, in which a method for altering a magnetic characteristic of a medium is provided. The method comprising the steps of providing a magnetic write head adjacent to a travelling web bearing a fluid magnetic slurry, providing a sequence of randomly arranged information signals, and transmitting the sequence of randomly arranged information signals to a magnetic write head controller. The magnetic write head is operated in response to the controller to provide sequential representations of the randomly arranged information signals at predetermined amplitude levels in the fluid magnetic slurry by altering a magnetically discernible characteristic of the slurry. The fluid magnetic slurry is then cured to permanently fix the sequential representations.

An apparatus in accordance with the invention comprises means for supporting and driving a web bearing a fluid magnetic slurry, magnetic write head means for controllably generating a magnetic field adjacent to the web, means for providing a sequence of randomly arranged information signals, means for transmitting the sequence of randomly arranged information signals to a magnetic write head controller, and means for operating the magnetic write head in response to the controller to provide sequential representations of the randomly arranged information signals at predetermined amplitudes in the fluid magnetic slurry by altering a magnetically discernible characteristic of the slurry.

In another embodiment, the apparatus comprises a first counter means for counting occurrences of an event and placing a magnetic write head in a first state in response to a first number of the occurrences, and a second counter means for counting occurrences of an event and placing a magnetic write head in a second state in response to a second number of the occurrences. In one embodiment, the medium is a slurry comprising numerous suspended magnetic particles.

Preferably, the apparatus further includes a rotary encoder generating a pulse train as an output, and an occurrence of the event corresponds to a pulse of the pulse train. The rotary encoder is in contact with a moving web of material upon which the medium is deposited.

In the preferred embodiment, the apparatus further includes a microcontroller, and the microcontroller places the magnetic write head in first and second states in response to signals from the first and second counters. In this embodiment of the invention, the first state of the magnetic write head in an OFF state, and the second state of the magnetic write head is an ON state.

In this embodiment, the microcontroller further includes means for generating a pseudorandom bit stream, and the microcontroller places the magnetic write head in the first and second states in dependence, at least in part, upon the pseudorandom bit stream.

In another embodiment, a system is provided for immutably altering a magnetic characteristic of a medium. The system comprises a moving web of material, a slurry of magnetic medium deposited on the moving web of material, and a rotary encoder in contact with the moving web of material, the encoder generating a pulse train as an output. A magnetic write head is positioned proximate to the moving web of material and the deposited slurry of magnetic material. A microcontroller, coupled to the magnetic write head includes first and second counters responsive to the pulse train generated by the rotary encoder, such that the microcontroller controls the write head to produce corresponding first and second regions of predetermined magnetic remanence in the slurry of magnetic material. The system additionally includes a dryer to facilitate hardening of the slurry of magnetic material, such that the regions of altered magnetic remanence become substantially immutable.

In this embodiment, the moving web of material comprises a moving web of plastic material. The moving web of material may also be a moving web of card stock or other suitable material. Preferably, the slurry of magnetic medium is a slurry comprising numerous suspended magnetic particles.

The microcontroller in this embodiment includes means for generating a pseudorandom bit stream, and the microcontroller controls the write head in response, at least in part, to the pseudorandom bit stream. The means for generating a pseudorandom bit stream comprises a linear feedback shift register. The microcontroller selects durations of the first and second regions of predetermined magnetic remanence in response, at least in part, to the pseudorandom bit stream.

In one embodiment, the first region of predetermined magnetic remanence is a region of unaltered magnetic remanence, while the second region of predetermined magnetic remanence is a region of reduced magnetic remanence. The duration of the first region of predetermined magnetic remanence may be randomly selected from a set of different, fixed durations, while the duration of the second region of predetermined magnetic remanence may be fixed. The dryer may be a thermal dryer, or, in the alternative, drying may be accomplished by exposing the wet slurry to an electron beam.

In yet another embodiment of the invention, a method is provided for altering a magnetic characteristic of a slurry magnetic medium. A slurry magnetic medium is provided, as well as a first electrical signal that is dependent, at least in part, on a first counter output, and a second electrical signal that is dependent, at least in part, on a second counter output. At least one of the first and second electrical signals is conditioned in response to a pseudorandom bit stream to generate a third electrical signal. The magnetic characteristic of the slurry magnetic medium is altered with the third electrical signal, then the slurry magnetic medium is hardened.

In yet another embodiment of the invention, an apparatus for altering a magnetic characteristic of a slurry magnetic medium is provided. The apparatus comprises means for providing a first electrical signal dependent, at least in part, on a first counter output, and means for providing a second electrical signal dependent, at least in part, on a second counter output. The apparatus further comprises means for conditioning at least one of the first and second electrical signals in response to a pseudorandom bit stream to generate a third electrical signal. There are means for altering the magnetic characteristic of the slurry magnetic medium with the third electrical signal, and means for hardening the slurry magnetic medium.

BRIEF DESCRIPTION OF THE DRAWINGS

FIG. 4 is a magnetic remanence profile of a medium processed in accordance with the present invention; and FIGS. 5(a)–5(c) depict encoding with a standard F2F protocol.

DETAILED DESCRIPTION

In accordance with the present invention, a method and apparatus for altering a magnetic characteristic of a medium are described that provide flexibility in the manner in which the medium is altered, allowing deterministic and random alteration of the medium, with the alterations being rendered substantially immutable thereafter by a drying process to forestall counterfeiters from duplicating or changing the altered characteristic. The invention can best be understood with reference to the accompanying drawing figures.

Figure 1:
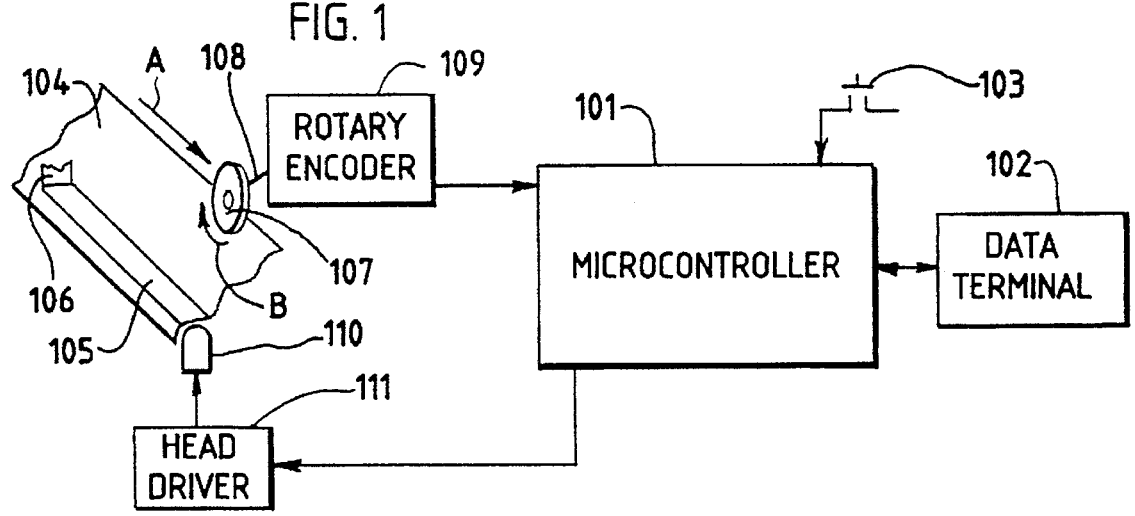
FIG. 1 is a block diagram of system components in accordance with the present invention.

FIG. 1 is a block diagram of system components in accordance with the present invention. The system includes a microcontroller 101 that is interconnected to a data terminal 102. The data terminal provides keyboard input capability and data display capability, as is well-known in the art. A START pushbutton 103 is coupled to the microcontroller to begin implementation of the magnetic medium alteration process.

Material 104, such as a moving web, upon which a slurry of magnetic medium 105 is deposited by an extrusion head, moves in contact with a wheel 107 whose shaft 108 drives a rotary encoder 109. The direction of motion of the web of material 104 is indicated by arrow A, while arrow B indicates the circular motion of the wheel 107 in response to the motion of the web 104. The rotary encoder 109 will be discussed in more detail below. The material to which the slurry is applied may be plastic, paper, or other suitable material that can be cut to the appropriate size after slurry deposition, alteration and drying are complete. Other suitable materials in addition to paper and plastic may comprise metals, alloys and glass and combinations of such materials. Further, the material itself can be precut to size before slurry deposition.

A slurry, of course, is a fluid mixture of a binder and finely divided particles. In the preferred embodiment, the slurry contains numerous suspended magnetic particles.

A magnetic write head is positioned proximate to the moving web of material 104 and the deposited slurry of magnetic material 105. Preferably, the write head 110 is positioned on the opposite side of the web 104 from the extrusion head 106, and along the path of the deposited slurry 105, separated from the head 106 by a short distance along the direction of motion A of the web 104. Of course, the purpose of the magnetic write head 110 is to generate a localized magnetic field, and not a generalized magnetic field. Consequently, an equivalent magnetic transducer that acts to expose the magnetic slurry to a changing magnetic field would function in this application. It may even be possible to mount one portion of the transducer above the moving web, and another portion below, and still achieve acceptable results.

The microcontroller 101 is coupled to the magnetic write head via a head driver board. The head driver 111 allows drive current level to be programmed for the write head 110 (such as via one of the microcontroller output lines), and also includes inputs for ENCODE DATA and ENCODE ENABLE functions, implemented in a conventional, well-known manner. Toggling the ENCODE DATA input of the head driver 111 switches write head 110 polarity, while toggling the ENCODE ENABLE turns the write head 110 on and off.

The microcontroller 101 is coupled to the rotary encoder 109, as mentioned above. The rotary encoder 109 delivers a pulse train to the microcontroller 101, which is configured to respond to occurrences of external events in a fashion that will be later treated in greater detail. In this embodiment of the invention, the external events to which the microcontroller 101 responds are pulses within the pulse train generated by the rotary encoder 109. The microcontroller 101 counts these pulse occurrences to temporally arrange the system processes that it controls. In fact, since the rotary encoder generates a pulse train in response to the moving web, with a known number of pulses generated for each unit of travel, the rotary encoder output is a position-determining signal for the system.

Figure 2:
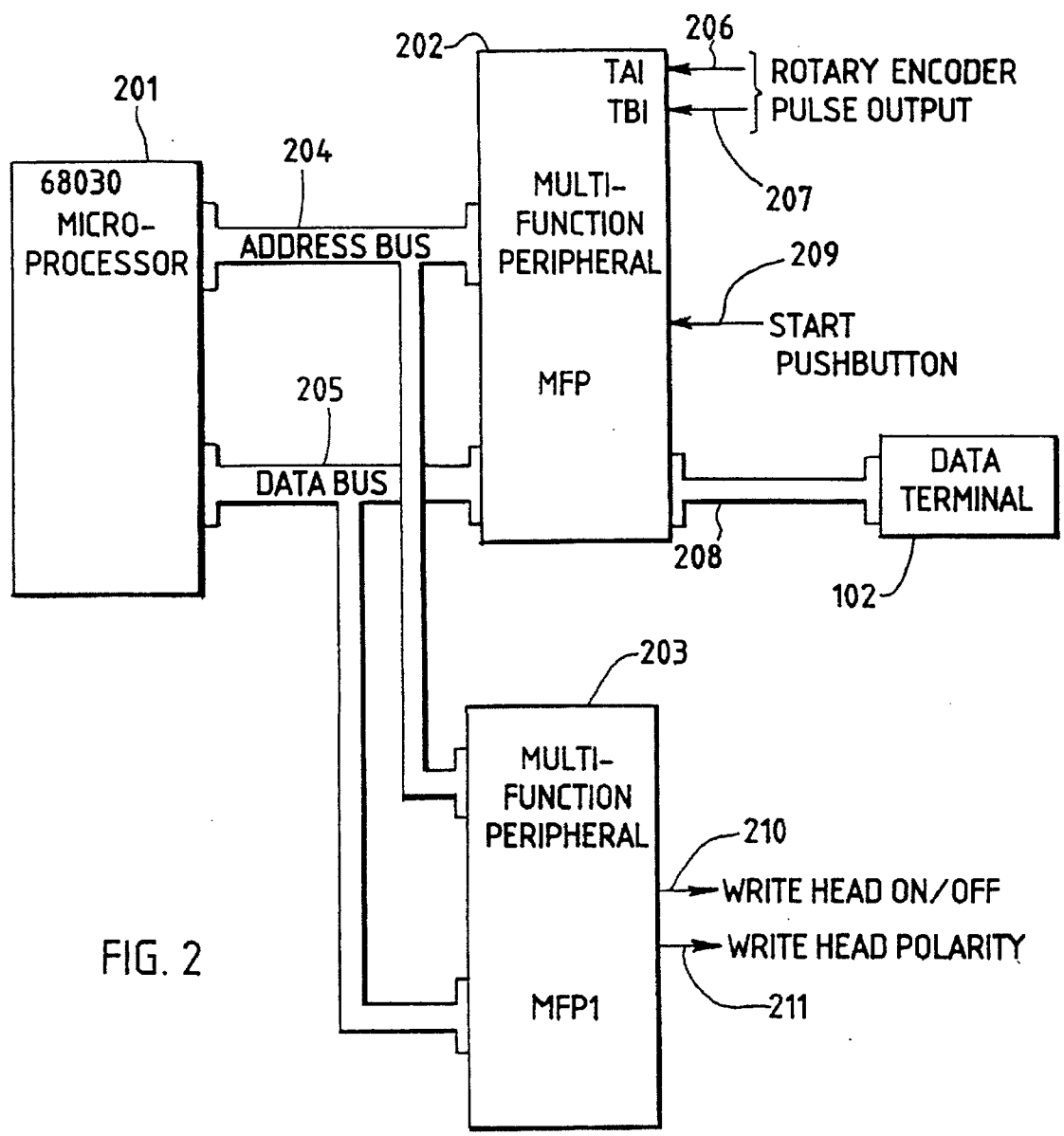
FIG. 2 illustrates the interconnection of the microprocessor and peripherals.

FIG. 2 is a block diagram illustrating the interconnection of a portion of the microcontroller 101 components. In one embodiment, the microcontroller includes a microprocessor 201, that is preferably an MC68030, manufactured by Motorola, Inc. Of course, there are other microprocessors that would function in this application if properly programmed. The microcontroller 101 also includes, in the preferred embodiment, two peripheral devices 201–202, that are interconnected with the microprocessor 201 (µP) via the address and data busses, 204 and 205 respectively. Naturally, the peripheral devices 201–202 require interconnection to µP control signals, and appropriate address decoding should be implemented so the peripherals 201–202 are configured to appear at predetermined locations in memory, but this type of interconnection is well-known in the applicable art, and is not shown for the sake of simplicity.

Preferably, the peripheral devices 210–202 are Multi-Function Peripherals (MFPs), MC68901, manufactured by Motorola, Inc. Other types of peripheral devices would also work, provided that they include similar counter and general-purpose input/output capabilities. A first MFP 202 is used for counter/timer functions, that will be explained in detail subsequently, to provide an input responsive to activation of the START pushbutton (103 in FIG. 1), and to establish a serial communication bus for interconnection with the system data terminal 103.

The pulse train output of the rotary encoder 109 is applied to the counter A and counter B external event inputs 206–207, labelled TAI and TBI, respectively, in FIG. 2. Each of these counters is programmed to generate an interrupt upon expiration. The procedure for selecting a particular operational configuration for a counter/timer is well-understood in the art, as are the programming requirements for configuring general purpose input/output (I/O) ports to act as input lines, output lines, or a mixture of the two.

In addition to counter/timer functions, the first MFP 202 is utilized to sense activation of the START pushbutton (103 in FIG. 1) at one of its general purpose inputs 209. Detection of the START signal transition generates an interrupt that is used to begin the magnetic material alteration process, as will be discussed in conjunction with the subsequent software description. Of course, as an alternative to the START button, a START signal could be provided electronically by the transport mechanism that propels the moving web of material. The magnetic material alteration process could also be initiated automatically in response to the moving web of material reaching a predetermined minimum, stable speed. Speed could be measured by dedicating an additional counter to counting rotary encoder pulses solely for speed determination. Of course, it would be appropriate to build some hysteresis into the software to avoid starting and stopping the alteration process at some critical web velocity.

The second MFP 203 is configured such that two of its general purpose I/O lines control operation of the write head. One of the general purpose outputs 210 is connected to the ENCODE ENABLE input of the head driver (111 in FIG. 1) and determines whether the write head is in an ON or OFF state. When the write head is in an ON state, a magnetic characteristic of the magnetic medium suspended in the slurry is altered. Specifically, magnetic remanence of the magnetic medium is reduced through exposure to the write head in its ON state. When the write head is in an OFF state, the magnetic remanence of the magnetic material remains unaltered.

A second output 211 of the MFP 203 connects to the ENCODE DATA input of the head driver. While this signal can be utilized to write time-varying data signals to the slurry magnetic medium, in the preferred embodiment it is used to control the polarity of the write head's magnetic field.

Figure 3:
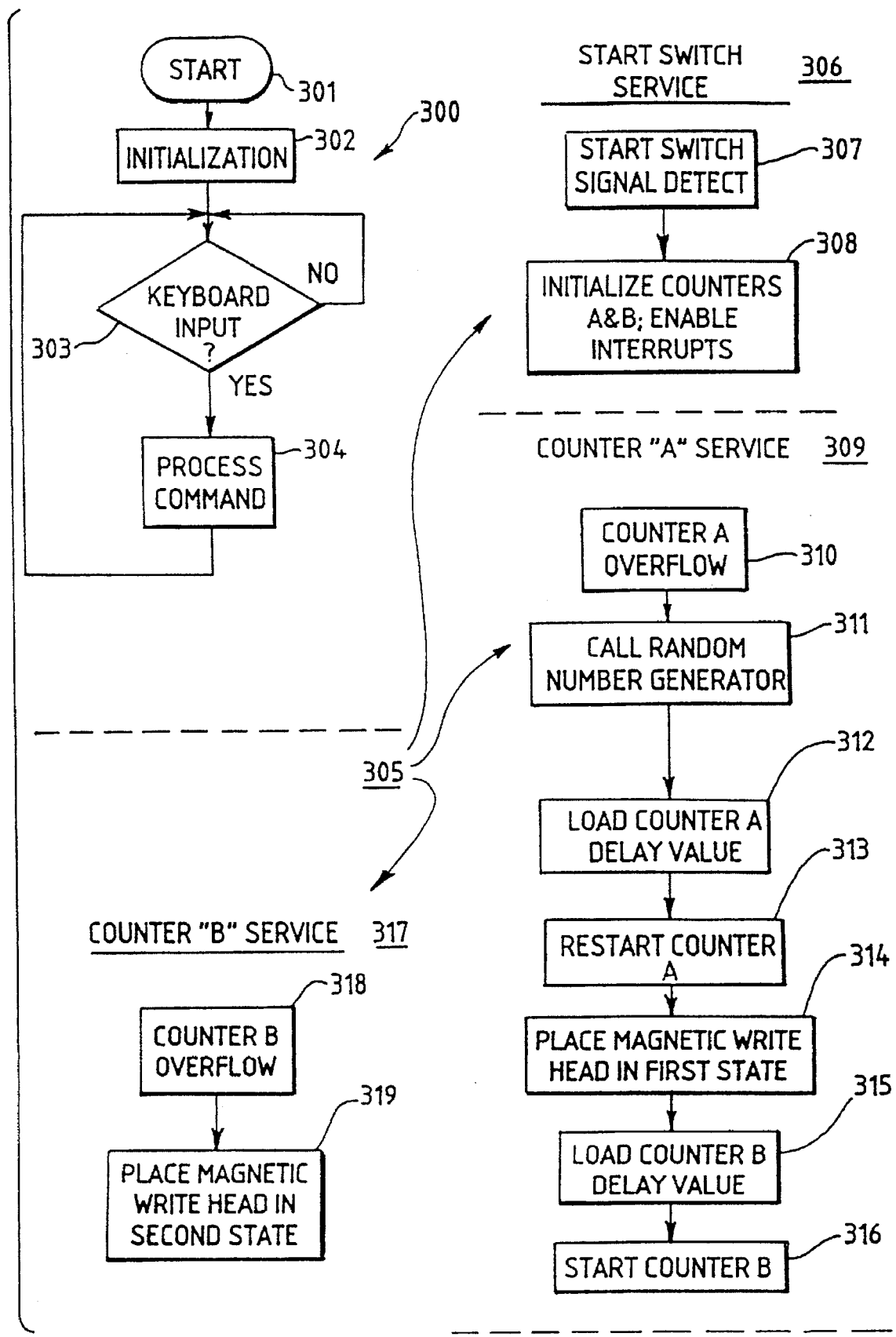
FIG. 3 is a flow chart of system software in accordance with the present invention.

FIG. 3 is a flow chart depicting both foreground and background tasks performed by the program executed by the microprocessor 201. Foreground tasks are those that run most frequently and have priority over other tasks. In the system of the preferred embodiment, background tasks (i.e., those of lower priority) are interrupted periodically by the foreground tasks. The sections of program code that execute the foreground tasks are those that are executed in response to an interrupt. These are normally referred to as interrupt service routines.

The background tasks, on the other hand, are usually inserted into the portion of a program that is not executed by interrupt processing, but is itself interrupted by foreground task execution. This portion of a program is often called the program main line. In the system in accordance with the present invention, the main line is characterized as the BACKGROUND LOOP of FIG. 3, generally depicted by the numeral 300. After a START state 301, the program main line performs initialization tasks 302 that include configuration of the MFPs and initialization of the software-implemented random number generator, that will be discussed in more detail hereafter.

As part of main line processing, the program then checks for keyboard input 303 from the system data terminal. If no input data is detected, the main line continues scanning. If, on the other hand, keyboard input is detected, the main line processes any input command received 304. This command processing step may involve displaying current system parameters on the system data terminal. After command processing, the main line resumes looking for keyboard input 303.

There are at least three primary foreground tasks 305 implemented in the software of the preferred embodiment. The first foreground task, generally depicted by the numeral 306, is an interrupt service routine that responds to an active transition of the START switch 307. The service routine then initializes counters A and B 308 by loading the proper delay values into the counter data registers and enabling the counter interrupts. As mentioned previously, counters A and B generate interrupts at expiration.

The counter A service routine 309 is executed whenever counter A overflow 310 occurs and interrupts are enabled. The service routine 309 loads the proper counter A delay value 312 into the counter A data register, then restarts counter A for its next count cycle 313. The magnetic write head is then placed into a first state 314, which, in the preferred embodiment, is an OFF state. Other states, such as predetermined different amplitude states, or an ON state, could also be selected, with proper adaptation of the write head driver and manipulation of appropriate control signals.

Prior to the step 312 of loading the counter A delay value, the flow chart of FIG. 3, includes the step 311 of calling a pseudorandom number generator subroutine, which is implemented by a linear feedback shift register (LFSR), well-known in the art. An LFSR, properly configured, generates a pseudorandom bit stream that does not repeat itself for millions of cycles, and can be viewed as a true random number generator for all practical purposes. The counter A service routine may call this random number generator routine and use its output to select from among a set of possible delay values for both counter A and counter B. The sets of values could be as large as desired. By selecting a sequence of three random bits from the random number generator, for example, one value from a set of eight possible values could be selected. Durations of the zones of alteration of the magnetic characteristic can thus be given a random attribute. The interrupt signals generated by counter overflow are electrical signals, and one might say that these electrical signals can be conditioned as described above by the pseudorandom bit stream that is the output of the random number generator to produce yet another electrical signal that is used to control the write head state.

One may also describe the use of the counter A interrupt service routine, in conjunction with the random number generator, as a means for selecting first and second time intervals from among a set of different, predetermined time intervals. Taking this selection process a bit further, it is also possible to select from among a set of predeterminable amplitude values for the write head. Since data could be encoded on the magnetic medium as part of this operation, it is appropriate to call the write head an encode head, with the amplitudes and durations of write head operation being termed encode amplitudes and encode durations, respectively.

In one mode of operation of the apparatus in accordance with the invention, a magnetic write head is positioned proximate to the slurry magnetic medium. The interrupt service routines in conjunction with the pseudorandom number generator serve as means for selecting encode amplitude and encode duration of the magnetic write head. Encode duration, as described above, is selected from a limited set (one having only a small number) of discrete values for encode duration. Encode amplitude is then selected such that encode amplitude remains constant throughout a given one of these time periods. This is not to say, of course, that a different, constant amplitude could not be selected for one or more subsequent time periods. Encode amplitude would be selected from a limited set of amplitude values, in much the same way as described with respect to encode durations. Methods for varying magnetic field strength of a magnetic write head among a set of predetermined values are known in the applicable art.

Whether random conditioning of the counter interrupt is implemented or not, after placing the magnetic write head in a first state 314, the counter B data register is loaded with the appropriate delay value 315, and counter B is started 316.

Counter B overflow 318 vectors to the counter B service routine 317. The counter B service routine 317 simply places the write head in a second state 319. In the preferred embodiment, this second state is an ON state, but, as discussed above with reference to the counter A service routine, other states could be selected as well.

FIG. 4 illustrates the fashion in which changing the write head states alters a magnetic characteristic of a medium. The diagram shown reflects the magnetic remanence of a slurry that has been hardened after alteration with the apparatus and by the method in accordance with the present invention. The magnetic remanence may be read by passing a magnetic read head over the altered region of the hardened slurry. The hardening process involves the use of a dryer, which, as is well-known in the applicable art, may use thermal, electron beam, or another appropriate drying technique.

The envelope 401 of the signal depicted in FIG. 4 represents the magnetic remanence of a medium after the alteration process described above. The magnetic write head (110 in FIG. 1) has been placed into an OFF state by the counter A service routine at a first point 402 along the envelope 401. The magnetic remanence of the medium gradually rises 403 to a value 404 consistent with that of an unaltered medium.

Counter/timer A and B registers are both loaded by the counter A service routine, as described previously. The value for the counter B register is selected so that counter B expires first, thus acting to time the duration 407 of a first region of predetermined magnetic remanence extending between 402 and 408. In the preferred embodiment, this first region of predetermined magnetic remanence is a region of unaltered magnetic remanence.

At point 408, the counter B service routine places the magnetic write head in a second state. In the preferred embodiment, this second state is an ON state, and results in a region of reduced magnetic remanence, which can be observed as a second, lower level 405 of the remanence signal envelope 401. This region of reduced magnetic remanence may be designed to have a fixed remanence value, or a remanence value or values may be selected that represents a reduction or reductions, by a predetermined percentage or percentages, of the remanence in the unaltered regions. The magnetic write head remains in the ON state for interval 406, until the timer A service routine, triggered by overflow of counter A, places the magnetic write head into its OFF state at point 409.

To vary the durations of the zones of predetermined magnetic remanence, the delay values loaded into the counter A and B registers need only be modified. This modification can be completely deterministic, or, as described above, can be performed at least partly in dependence upon a pseudorandom bit stream. At point 410, for example, the counter A service routine places the magnetic write head into the OFF state, and a region of unaltered magnetic remanence is created for interval 414, until the counter/timer B service routine changes the state of the write head to the ON state. A region of reduced magnetic remanence results until the end of interval 413. At point 412, the timer A service routine again places the magnetic write head into the OFF state, causing the remanence to return to the unaltered state. Of course, as discussed above, the regions of altered and unaltered magnetic remanence can be selected to be of any reasonable duration, just by selecting the proper delay values for the counter A and counter B data registers.

To summarize the method disclosed according to one embodiment of the invention, a magnetic write head is provided, as adjacent to a travelling web that bears a fluid magnetic slurry. A sequence of randomly arranged information signals, provided through the counter interrupt service routines, which may operate in conjunction with the random number generator, is provided for purposes of controlling the magnetic write head. The write head is controlled through the head driver to provide sequential representations of these randomly arranged information signals at predetermined levels in the fluid magnetic slurry by altering a magnetically discernible characteristic of the slurry. It will be apparent that the "fluid" magnetic slurry may begin to harden and cure immediately after application. As such, the alteration of the magnetic characteristics occur prior to final curing or hardening of the slurry into a condition in which the magnetic particles may not be physically reoriented. Thus, as used herein, the terms fluid or liquid magnetic slurry embrace uncured and partially cured slurries in which the magnetic particle orientations may be altered to produce an altered magnetic characteristic. The slurry is then cured or hardened, generally by a thermal dryer, by electron beam exposure, or by other acceptable drying techniques.

In one embodiment, these sequential representations are spaced apart by a preselected interval having a preselected amplitude. This preselected amplitude may correspond to an ON condition of the magnetic write head, for example, although other amplitude values may be selected as well. The representations of the randomly arranged information signals themselves, in one embodiment, correspond to an OFF condition of the write head. These representations may also comprise intervals that are selected, for example, from a group of intervals, such as two intervals, or, in the alternative, may each have a predetermined duration selected from a group of durations, such as two durations.

Of course, the random information signals may take many forms. In one exemplary embodiment, the randomly arranged information signals are used to encode a binary bit stream using a standard F2F protocol. As is well-known in the art, F2F maps a binary "1" to a first frequency, and a binary "0" to a second frequency, where one frequency is exactly twice the other frequency.

FIG. 5(a) depicts a binary bit stream 501 in a non-return to zero, or NRZ format 502. As can be seen from the figure, the bit stream 501 is 11100010010. FIG. 5(b) shows the binary bits 501 as they would be encoded in an F2F protocol. Note that a binary "1" representation, as illustrated in one interval 504, is a complete cycle of a first frequency. A binary "0," on the other hand, as shown in a second interval 505 in the figure, is only one-half cycle of a second frequency. This second frequency is exactly one-half of the first frequency. Consequently, only one-half cycle of the second frequency will fit in the same size interval used for the binary "1" 504 described above. For standard F2F, the same size time interval is used for representation of binary "1's" or "0's." Of course modifications of this standard exist, and are used from time to time.

FIG. 5(c) illustrates sequential representations 506 formed by altering a magnetically discernible characteristic of a fluid magnetic slurry to encode the binary bit stream 501 therein.

There has been described herein a method and apparatus for altering a magnetic characteristic of a medium that provides greater flexibility than those of the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for altering a magnetic characteristic of a magnetic medium, the method comprising the steps of:
   (a) providing a magnetic write head adjacent to a document having a support surface bearing a fluid magnetic slurry;
   (b) providing a sequence of randomly arranged information signals;
   (c) transmitting the sequence of randomly arranged information signals to a magnetic write head controller;
   (d) operating the magnetic write head in response to the controller to provide sequential representations of the randomly arranged information signals at predetermined amplitude levels in the fluid magnetic slurry by altering a magnetically discernible characteristic of the slurry; and
   (e) curing the fluid magnetic slurry to permanently fix said sequential representations.

2. The method in accordance with claim 1, wherein the document support surface comprises a portion of a travelling web.

3. The method in accordance with claim 2, wherein the sequential representations of the randomly arranged information signals in the cured magnetic slurry are spaced apart by a preselected interval having a preselected amplitude.

4. The method in accordance with claim 3, wherein the preselected amplitude corresponds to an on condition of the magnetic write head, and the representations of the randomly arranged information signals correspond to an off condition of the magnetic write head.

5. The method in accordance with claim 2, wherein the representations of the randomly arranged information signals have predetermined amplitude levels which correspond to off conditions of the magnetic write head.

6. The method in accordance with claim 2, wherein the representations of the randomly arranged information signals are intervals according to a standard F2F protocol.

7. The method in accordance with claim 2, wherein the representations of the randomly arranged information signals comprise intervals selected from a group of two possible intervals.

8. The method in accordance with claim 2, wherein the representations of the randomly arranged information signals each have a predetermined duration selected from a group of two possible durations.

9. The method in accordance with claim 2, wherein the medium comprises a mixture of a binder and finely divided magnetic particles.

10. The method in accordance with claim 2, wherein the step (b) of providing a sequence of randomly arranged information signals further comprises the steps of:
    (i) providing a rotary encoder in contact with the travelling web, the rotary encoder outputting a stream of pulses proportional to web movement;
    (ii) counting the pulses to determine position of the magnetic write head along the travelling web;
    (iii) upon reaching a predetermined count, utilizing a random number generator to make a random selection of a particular information signal.

11. The method in accordance with claim 2, wherein the travelling web comprises a travelling web of plastic material.

12. The method in accordance with claim 2, wherein the travelling web comprises a travelling web of paper material.

13. The method in accordance with claim 2, wherein curing the fluid magnetic slurry comprises curing the fluid slurry by electron beam exposure.

14. The method in accordance with claim 2, wherein curing the fluid magnetic slurry comprises curing the fluid slurry in a thermal dryer.

15. An apparatus for altering a magnetic characteristic of a magnetic medium comprising:
   means for supporting and driving a web bearing a fluid magnetic slurry;
   magnetic write head means for controllably generating a magnetic field adjacent to said web;
   means for providing a sequence of randomly arranged information signals;
   means for transmitting the sequence of randomly arranged information signals to a magnetic write head controller;
   means for operating said magnetic write head in response to the controller to provide sequential representations of the randomly arranged information signals at predetermined amplitudes in the fluid magnetic slurry by altering a magnetically discernible characteristic of the slurry.

16. An apparatus for creating an enhanced random magnetic characteristic in a fluid magnetic region carried on an underlying medium, the apparatus comprising:
   a microcontroller having a position-determining signal input, a magnetic write head control output, and a random electrical signal generator having a random signal output that conditions the magnetic write head control output;
   a source of position-determining signals coupled to the position-determining signal input;
   a magnetic write head coupled to the magnetic write head control output and located adjacent to the fluid magnetic region for randomly altering the magnetic characteristics thereof sequentially in response to the random electrical signal generator output.

17. An apparatus for altering a magnetic characteristic of a medium, the apparatus comprising:
   means for generating a pseudorandom bit stream;
   means for selecting a first time interval from a set of different, predetermined time intervals, based, at least in part, upon the pseudorandom bit stream;
   means for selecting a second, fixed time interval;
   means for turning off a magnetic write head at the end of the first time interval;
   means for turning on the magnetic write head at the end of the second time interval.

18. The apparatus of claim 17, wherein said means for turning on the magnetic write head further includes means for selecting an amplitude from among a set of different, fixed amplitudes.

19. The apparatus of claim 18, wherein the means for selecting an amplitude selects an amplitude based, at least in part, upon the pseudorandom bit stream.

20. The apparatus of claim 18, wherein the means for generating a pseudorandom bit stream comprises a linear feedback shift register.

21. The apparatus of claim 18, wherein the means for selecting the first time interval comprises an interrupt service routine responding to a counter overflow interrupt.

22. The apparatus of claim 18, wherein the means for selecting the second time interval comprises an interrupt service routine responding to a counter overflow interrupt.

23. An apparatus for altering a magnetic characteristic of a medium, the apparatus comprising:
   first counter means for counting occurrences of an event and placing a magnetic write head in a first state in response to a first number of said occurrences;
   second counter means for counting occurrences of an event and placing a magnetic write head in a second state in response to a second number of said occurrences.

24. The apparatus of claim 23, wherein said medium is a slurry comprising numerous suspended magnetic particles.

25. The apparatus of claim 23, wherein the apparatus further includes a rotary encoder generating a pulse train as an output, and an occurrence of said event corresponds to a pulse of said pulse train.

26. The apparatus of claim 25, wherein said rotary encoder is in contact with a moving web of material upon which said medium is deposited.

27. The apparatus of claim 23, wherein the apparatus further includes a microcontroller, and the microcontroller places the magnetic write head in said first and second states in response to signals from said first and second counters.

28. The apparatus of claim 27, wherein said first state of the magnetic write head is an OFF state.

29. The apparatus of claim 27, wherein said second state of the magnetic write head is an ON state.

30. The apparatus of claim 27, wherein the microcontroller further includes means for generating a pseudorandom bit stream, and the microcontroller places the magnetic write head in said first and second states in dependence, at least in part, upon said pseudorandom bit stream.

31. A system for immutably altering a magnetic characteristic of a medium, the system comprising:
   a moving web of material;
   a slurry of magnetic medium deposited on the moving web of material;
   a rotary encoder in contact with the moving web of material, the encoder generating a pulse train as an output;
   a magnetic write head positioned proximate to the moving web of material and the deposited slurry of magnetic material;
   a microcontroller coupled to the magnetic write head, the microcontroller including:
   first and second counters responsive to the pulse train generated by the rotary encoder, such that the microcontroller controls the write head to produce corresponding first and second regions of predetermined magnetic remanence in the slurry of magnetic material;
   a dryer to facilitate hardening of the slurry of magnetic material, such that the regions of altered magnetic remanence become substantially immutable.

32. The system of claim 31, wherein the moving web of material comprises a moving web of plastic material.

33. The system of claim 31, wherein the moving web of material comprises a moving web of card stock.

34. The system of claim 31, wherein the slurry of magnetic medium is a slurry comprising numerous suspended magnetic particles.

35. The system of claim 31, wherein the microcontroller includes means for generating a pseudorandom bit stream, and the microcontroller controls the write head in response, at least in part, to the pseudorandom bit stream.

36. The system of claim 35, wherein the means for generating a pseudorandom bit stream comprises a linear feedback shift register.

37. The system of claim 35, wherein the microcontroller selects durations of said first and second regions of predetermined magnetic remanence in response, at least in part, to the pseudorandom bit stream.

38. The system of claim 31, wherein the first region of predetermined magnetic remanence is a region of unaltered magnetic remanence.

39. The system of claim 31, wherein the second region of predetermined magnetic remanence is a region of reduced magnetic remanence.

40. The system of claim 37, wherein the duration of the first region of predetermined magnetic remanence is randomly selected from a set of different, fixed durations.

41. The system of claim 37, wherein the duration of the second region of predetermined magnetic remanence is fixed.

42. The system of claim 31, wherein the dryer is a thermal dryer.

43. The system of claim 31, wherein the dryer is an electron beam dryer.

44. A method for altering a magnetic characteristic of a slurry magnetic medium, the method comprising the steps of:

(a) providing a slurry magnetic medium;

(b) positioning a magnetic write head proximate to the magnetic medium;

(c) providing a first time interval having a first duration;

(d) providing a second time interval having a second duration;

(e) at the expiration of the first time interval, turning on the magnetic write head for a fixed interval at a predetermined power output;

(f) at the expiration of the second time interval, turning off the magnetic write head for a fixed interval;

(g) repeating steps (e) and (f) for a predetermined period; and (h) hardening the slurry magnetic medium.

45. A method for altering a magnetic characteristic of a slurry magnetic medium, the method comprising the steps of:

(a) providing a slurry magnetic medium;

(a) providing a first electrical signal dependent, at least in part, on a first counter output;

(b) providing a second electrical signal dependent, at least in part, on a second counter output;

(c) conditioning at least one of said first and second electrical signals in response to a pseudorandom bit stream to generate a third electrical signal;

(d) altering the magnetic characteristic of the slurry magnetic medium with the third electrical signal; and (e) hardening the slurry magnetic medium.

46. An apparatus for altering a magnetic characteristic of a slurry magnetic medium, the apparatus comprising:

means for providing a first electrical signal dependent, at least in part, on a first counter output;

means for providing a second electrical signal dependent, at least in part, on a second counter output;

means for conditioning at least one of said first and second electrical signals in response to a pseudorandom bit stream to generate a third electrical signal;

means for altering the magnetic characteristic of the slurry magnetic medium with the third electrical signal;

means for hardening the slurry magnetic medium.

47. A document suitable for authentication, the document comprising:

a support surface;

a magnetic medium disposed upon the support surface;

the magnetic medium including permanently fixed sequential representations of randomly arranged information signals, wherein the permanently fixed sequential representations are produced by:

(a) providing a magnetic write head adjacent to a document having a support surface bearing a fluid magnetic slurry;

(b) providing a sequence of randomly arranged information signals;

(c) transmitting the sequence of randomly arranged information signals to a magnetic write head controller;

(d) operating the magnetic write head in response to the controller to provide sequential representations of the randomly arranged information signals at predetermined amplitude levels in the fluid magnetic slurry by altering a magnetically discernible characteristic of the fluid slurry; and (e) curing the fluid magnetic slurry to permanently fix said sequential representations.

* * * * *